United States Patent
Lee

(10) Patent No.: US 10,271,349 B2
(45) Date of Patent: Apr. 23, 2019

(54) SCHEDULING APPARATUS AND METHOD FOR MULTICAST BROADCAST SERVICE

(71) Applicant: Electronics and Telecommunications Research Institute, Daejeon (KR)

(72) Inventor: Kook Jin Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 15/959,624

(22) Filed: Apr. 23, 2018

(65) Prior Publication Data

US 2018/0242352 A1    Aug. 23, 2018

Related U.S. Application Data

(63) Continuation of application No. 15/641,115, filed on Jul. 3, 2017, now Pat. No. 9,955,500, and a (Continued)

(30) Foreign Application Priority Data

Apr. 28, 2009   (KR) .................. 10-2009-0036969
Sep. 29, 2009   (KR) .................. 10-2009-0092474

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0007* (2013.01); *H04L 5/0091* (2013.01); (Continued)

(58) Field of Classification Search
CPC .......... H04W 72/1289; H04W 72/005; H04W 84/0042; H04L 5/0007; H04L 5/0091; H04L 5/0094; H04L 12/18
See application file for complete search history.

(56) References Cited

U.S. PATENT DOCUMENTS 8,477,702 B2   7/2013 Lee
8,843,118 B2   9/2014 Lu et al.
(Continued)

FOREIGN PATENT DOCUMENTS

EP   2051410 A1   4/2009
JP   2006-121396   5/2006
(Continued)

OTHER PUBLICATIONS

Samsung, "MBMS: Requirements for the Scheduling Message," 3GPP TSG RAN2 MBMS adhoc, Budapest, Hungary (2002).
(Continued)

*Primary Examiner* — Melvin C Marcelo

(57) ABSTRACT

Provided are a scheduling apparatus and method for a multicast broadcast service. Scheduling information is configured with at least one of information related to a location in which each multicast broadcast service, which is identified by a unique identifier within one scheduling period, starts and information related to a location in which each multicast broadcast service ends, and a scheduling block including the configured scheduling information is generated. There is an advantage that power management of user equipment is easy, and a time delay when initially entering the MBMS and a channel change time when selecting a different MBMS are reduced.

25 Claims, 16 Drawing Sheets

Related U.S. Application Data continuation of application No. 14/933,399, filed on Nov. 5, 2015, now Pat. No. 9,699,805, which is a continuation of application No. 13/910,524, filed on Jun. 5, 2013, now Pat. No. 9,204,424, which is a continuation of application No. 12/769,225, filed on Apr. 28, 2010, now Pat. No. 8,477,702.

(51) Int. Cl.
    *H04W 72/00*     (2009.01)
    *H04L 12/18*     (2006.01)
    *H04W 84/04*     (2009.01)

(52) U.S. Cl.
    CPC ............ *H04L 5/0094* (2013.01); *H04L 12/18* (2013.01); *H04W 72/005* (2013.01); *H04W 84/042* (2013.01)

(56) References Cited

U.S. PATENT DOCUMENTS

| | | |
|---|---|---|
| 9,204,424 B2 | 12/2015 | Lee |
| 2005/0095985 A1 | 5/2005 | Hafeoz |
| 2006/0067281 A1 | 3/2006 | Kwak |
| 2007/0183358 A1 | 8/2007 | Cai |
| 2009/0207851 A1 | 8/2009 | Nosley |
| 2010/0234034 A1 | 9/2010 | Aoyama et al. |
| 2010/0309835 A1 | 12/2010 | Kuo |
| 2011/0188436 A1 | 8/2011 | Damnjanovic et al. |
| 2012/0140778 A1 | 6/2012 | Wang et al. |
| 2013/0265931 A1 | 10/2013 | Lee |

FOREIGN PATENT DOCUMENTS

| | | |
|---|---|---|
| JP | 2008-136245 | 6/2008 |
| KR | 1020100015731 | 2/2010 |

OTHER PUBLICATIONS

European Search Report for Application No. 10161301.6, dated Aug. 24, 2010.
3GPP TS 25.331 V7.8.0 (Mar. 2008), Radio Resource Control (RRC), pp. 1, 484, 485.
U.S. Appl. No. 61/184,847, filed Jun. 8, 2009.
Samsung, R2-040756 "MBMS: Requirements for the Scheduling message," Apr. 20-22, 2004, 3GPP TSG RAN2 MBMS adhoc, pp. 1-3.
Non-Final Office Action dated Dec. 18, 2015 during the prosecution of U.S. Appl. No. 14/933,399.
Final Office Action dated Sep. 7, 2016 during the prosecution of U.S. Appl. No. 14/933,399.

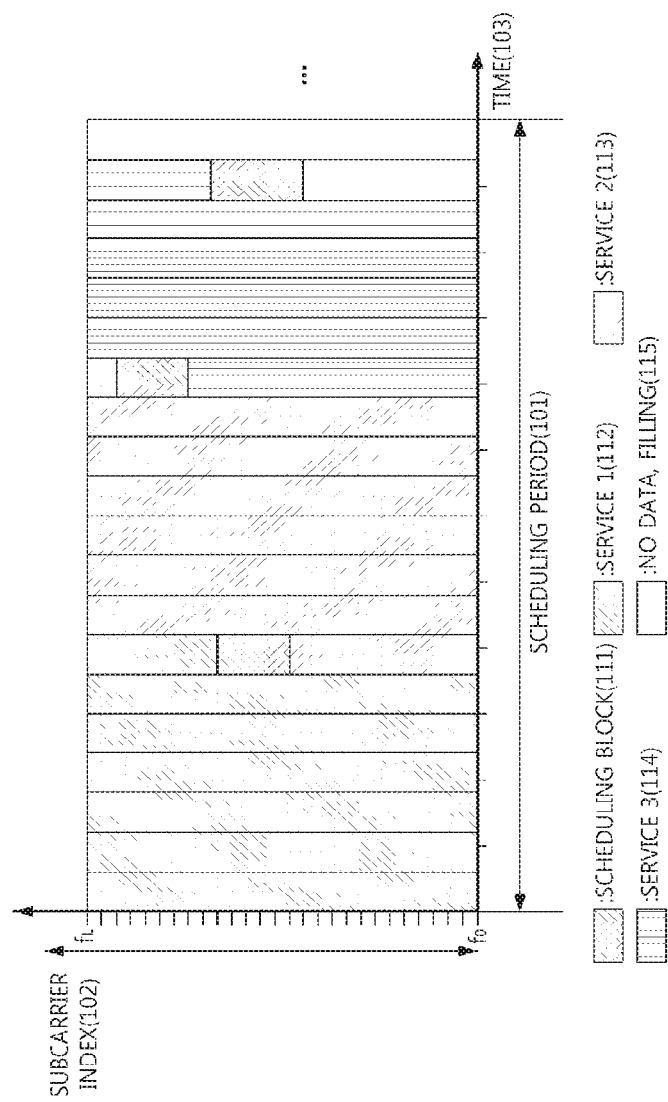

FIG. 7

| SERVICE ID | P | START POINT | END POINT | |
|---|---|---|---|---|
| SERVICE 1 | 0 | 0, 0 | 3, 2 | END TAG |
| SERVICE 2 | 2 | END TAG | | |
| SERVICE 3 | 0 | 3, 3 | 6, 3 | END TAG |

SCHEDULING PERIOD 1

FIG. 8

| | 801 | 802 | 803 |
|---|---|---|---|
| | ID | P | START POINT |
| | s1 | 0 | 0, 0 |
| | s2 | 0 | 2, 4 |
| | s3 | 0 | 4, 3 |
| | d | 0 | 6, 5 |

| | 801 | 802 | 803 |
|---|---|---|---|
| | ID | P | START POINT |
| | s1 | 0 | 0, 0 |
| | s2 | 2 | 0 |
| | s3 | 0 | 3, 3 |
| | d | 0 | 6, 5 |

←―― SCHEDULING PERIOD 1 ――→  ←―― SCHEDULING PERIOD 2 ――→

SCHEDULING APPARATUS AND METHOD FOR MULTICAST BROADCAST SERVICE

RELATED APPLICATIONS

This application is a continuation of U.S. patent application Ser. No. 15/641,115 filed on Jul. 3, 2017, which is a continuation of U.S. patent application Ser. No. 14/933,399 filed on Nov.5, 2015 and issued as U.S. Pat. No. 9,699,805, which is a continuation application of U.S. patent application Ser. No. 13/910,524 filed on Jun. 5, 2013, which is a continuation application of U.S. patent application Ser. No. 12/769,225 filed on Apr. 28, 2010, which claims priority to, and the benefit of, Korean Patent Application No. 10-2009-0036969 filed on Apr. 28, 2009 and Korean Patent Application No. 10-2009-0092474 filed on Sep. 29, 2009 in the Korean Intellectual Property Office (KIPO), the entire contents of which are hereby incorporated by reference.

BACKGROUND

1. Technical Field

Example embodiments of the present invention relate in general to a scheduling apparatus and method for a multicast broadcast service and more specifically to a scheduling apparatus and method for a multicast broadcast service using a scheduling block for a multicast broadcast service.

2. Related Art

A 3rd Generation Partnership Project (3GPP) Long Term Evolution (LTE) mobile communication system, which is currently being standardized, is a next generation communication system which is evolved to be capable of providing a variety of high-speed data services to a packet-based mobile communication network. For example, a service technique that makes it possible to transmit multimedia contents via a mobile communication network in a broadcast form or a multicast form known as a multimedia broadcast/multicast service (MBMS) is being introduced together with a voice service and a packet service.

In the MBMS, multimedia is transmitted via a radio network in a broadcast form or a multicast form, and so it is possible to provide a plurality of users with a service using a small radio resource. In the LTE system, it is possible to allocate a radio resource for the MBMS in a time and frequency domain using Orthogonal Frequency Division Multiple Access (OFDMA) as a multiple access method. A multicast broadcast service is supported not only in the 3GPP LTE system, but also IEEE 802.16m.

In the current LTE system, a multicast control channel (MCCH) and an MBMS traffic channel (MTCH) are defined as logical channels for providing the MBMS. The two channels correspond to multicast channels (MCH) which are transport channels, and the MCH corresponds to a physical multicast channel (PMCH), a physical channel.

The MTCH is used to transmit MBMS data traffic, and one MTCH corresponds to each MBMS. The MCCH transmits control information of the MTCH(s) and session control information related to the MBMS.

User equipment (UE) which uses the MBMS receives system information transmitted through a broadcast channel (BCH) and can acquire allocation information of a radio frame and a subframe through which the MBMS is provided from the received system information.

One or more MTCH(s) through which MBMS data is transmitted may be multiplexed into one MCH and then transmitted for efficient use of the radio resource. That is, a variety of MBMSs may be multiplexed into and transmitted through one MCH, and it may be dynamically changed at each scheduling period or interval. That is, since a location of a resource allocated to a specific MBMS which the UE desires to receive is variable, the UE can be provided with a desired MBMS only when a location of a subframe including a corresponding MBMS is recognized exactly.

Thus, in order for the UE to receive a desired MBMS, a scheme capable of efficiently transmitting scheduling information between services (of the MTCH) to the UE is required.

SUMMARY

Accordingly, example embodiments of the present invention are provided to substantially obviate one or more problems due to limitations and disadvantages of the related art.

Example embodiments of the present invention provide a scheduling method of an MBMS for efficient use of radio resources.

In some example embodiments, a scheduling method for a multicast broadcast service includes: configuring scheduling information including at least one of information related to a location in which each multicast broadcast service, which is identified by a unique identifier within one scheduling period, starts and information related to a location in which each multicast broadcast service ends; and generating a scheduling block including the configured scheduling information.

The scheduling block may be located at a first location within one scheduling period.

The scheduling block may be located behind a location in which each multicast broadcast service ends.

The scheduling block may include scheduling information for a corresponding multicast broadcast service of the next scheduling period.

The length of the scheduling information may be variable.

The scheduling information may further include an end tag representing the end of the scheduling information for each service.

The scheduling information may further include border information related to a border location of each multicast broadcast service, and the border information may represent whether or not each multicast broadcast service used the last resource of each subframe.

The scheduling information may further include information for a scheduling period in which each multicast broadcast service is included.

The scheduling information may include scheduling information for a temporally subsequent scheduling period as well as scheduling information for a scheduling period to which the scheduling information currently belongs.

The scheduling information may include scheduling information for a multicast broadcast service which is not included in a current scheduling period in which the scheduling information is included.

Information related to a location in which each multicast broadcast service starts or information related to a location in which each multicast broadcast service ends may additionally represent whether a session was finished with respect to a corresponding service.

Information related to a location in which each multicast broadcast service starts or information related to a location in which each multicast broadcast service ends may additionally represent whether or not a corresponding service is included in a current scheduling period.

In other example embodiments, a scheduling apparatus for a multicast broadcast service includes: configuring scheduling information including at least one of information related to a location in which each multicast broadcast service, which is identified by a unique identifier within one scheduling period, starts and information related to a location in which each multicast broadcast service ends; and generating a scheduling block including the configured scheduling information.

Using the scheduling method for the MBMS according to example embodiments of the present invention, it is possible to exactly and efficiently receive the MBMS scheduled in the LTE system. Therefore, there is an advantage that power management of the UE is easy, and a time delay when initially entering the MBMS and a channel change time when selecting a different MBMS are reduced.

BRIEF DESCRIPTION OF DRAWINGS

Example embodiments of the present invention will become more apparent by describing in detail example embodiments of the present invention with reference to the accompanying drawings, in which:

FIG. 4A illustrates another example of a scheduling block for an MBMS according to example embodiments of the present invention;

FIG. 7 illustrates a scheduling block and a configuration thereof according to each of MBMSs according to a third example embodiment of the present invention;

FIG. 8 illustrates a configuration of a scheduling block of each of MBMSs according to a fourth example embodiment of the present invention;

DESCRIPTION OF EXAMPLE EMBODIMENTS

Figure 1:
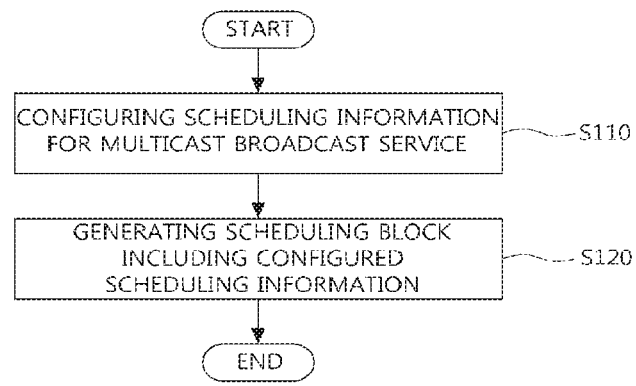
FIG. 1 is a flowchart for explaining a scheduling method for a multicast broadcast service according to example embodiments of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

As used herein, the term "user equipment (UE)" may be referred to as a mobile station, user terminal (UT), wireless terminal, access terminal (AT), terminal, subscriber unit, subscriber station (SS), wireless device, wireless communication device, wireless transmit/receive unit (WTRU), moving node, mobile, or other terms. Various example embodiments of a UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

In this specification, the term "base station" is used to mean a different term including Node-B, eNode-B, a base transceiver system, and an access point.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

With reference to the appended drawings, exemplary embodiments of the present invention will be described in detail below. To aid in understanding the present invention, like numbers refer to like elements throughout the description of the figures, and the description of the same component will not be reiterated.

FIG. 1 is a flowchart for explaining a scheduling method for a multicast broadcast service according to example embodiments of the present invention.

Referring to FIG. 1, the scheduling method for the multicast broadcast service according to example embodiments of the present invention may include operation (S110) of configuring scheduling information and operation (S120) of generating a scheduling block including the configured scheduling information and may further include operation of transmitting the generated scheduling block (not shown).

In operation of configuring the scheduling information (S110), scheduling information including at least one of information related to a location at which each multicast broadcast service identified by a unique identifier within one scheduling period starts and information related to a location at which each multicast broadcast service ends is configured. The configured scheduling information is included in the scheduling block and transmitted.

Figure 2:
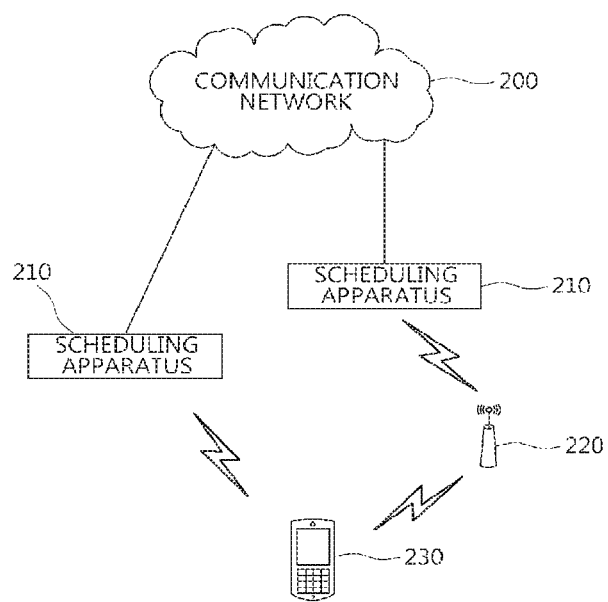
FIG. 2 illustrates a communication system according to example embodiments of the present invention.

FIG. 2 illustrates a communication system according to example embodiments of the present invention.

The communication system according to example embodiments of the present invention may include a communication network 200, a multicast broadcast scheduling apparatus 210, a relay 220, and at least one user terminal 230. The communication system according to example embodiments of the present invention may not include any relay.

The scheduling apparatus 210 for the multicast broadcast service according to example embodiments of the present invention configures the scheduling information which includes at least one of information related to a location at which each multicast broadcast service identified by a unique identifier within one scheduling period starts and information related to a location at which each multicast broadcast service ends and generates the scheduling block including the configured scheduling information. An example embodiment of the scheduling apparatus 210 includes a base station.

In the current LTE system, the scheduling information of the MBMS is provided through an MCH subframe allocation pattern (hereinafter, MSAP) occasion. One or more MSAP occasions may be included in one scheduling period or scheduling interval (101 in FIG. 3A and FIG. 4A).

The scheduling period or scheduling interval is a period which is divided again so that MBMSs, which were multiplexed for efficient discontinuous receptions of the user terminal and MBSFN synchronization of base stations, do not overlap in a time axis. The scheduling information for MBMS data that has been divided again is transmitted to the user terminal through the scheduling block. In schemes suggested up to now, a configuration of the scheduling period may be divided into two according to a location of the scheduling block 111. The respective cases are illustrated in FIG. 3A and FIG. 4A.

Figure 3A:
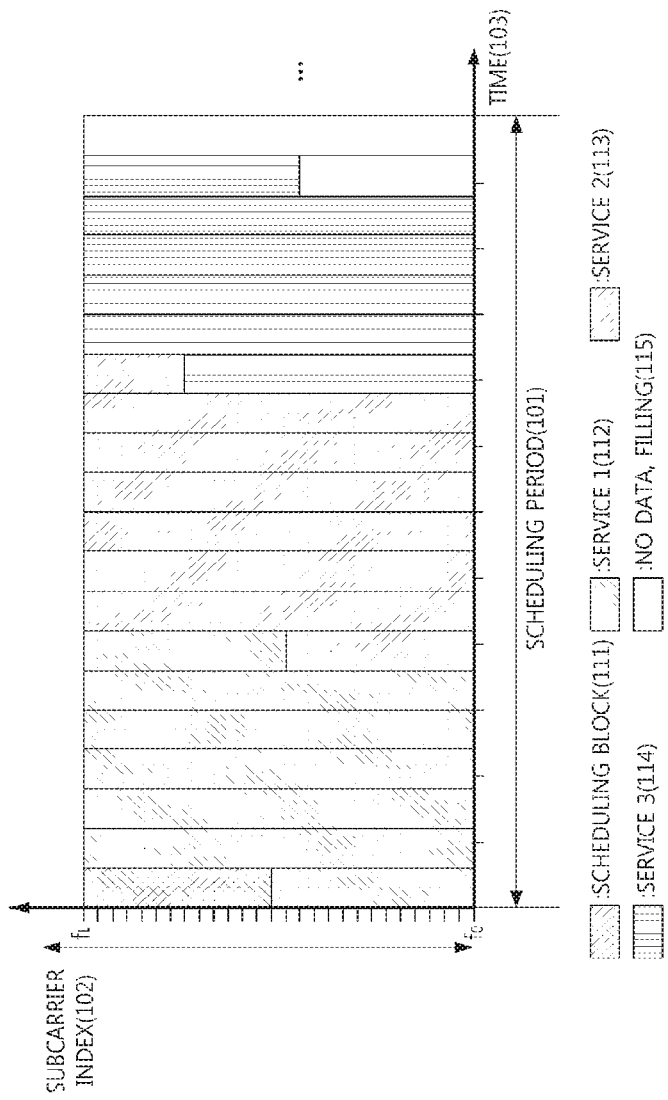
FIG. 3A illustrates an example of a scheduling block for an MBMS according to example embodiments of the present invention.
Figure 3B:
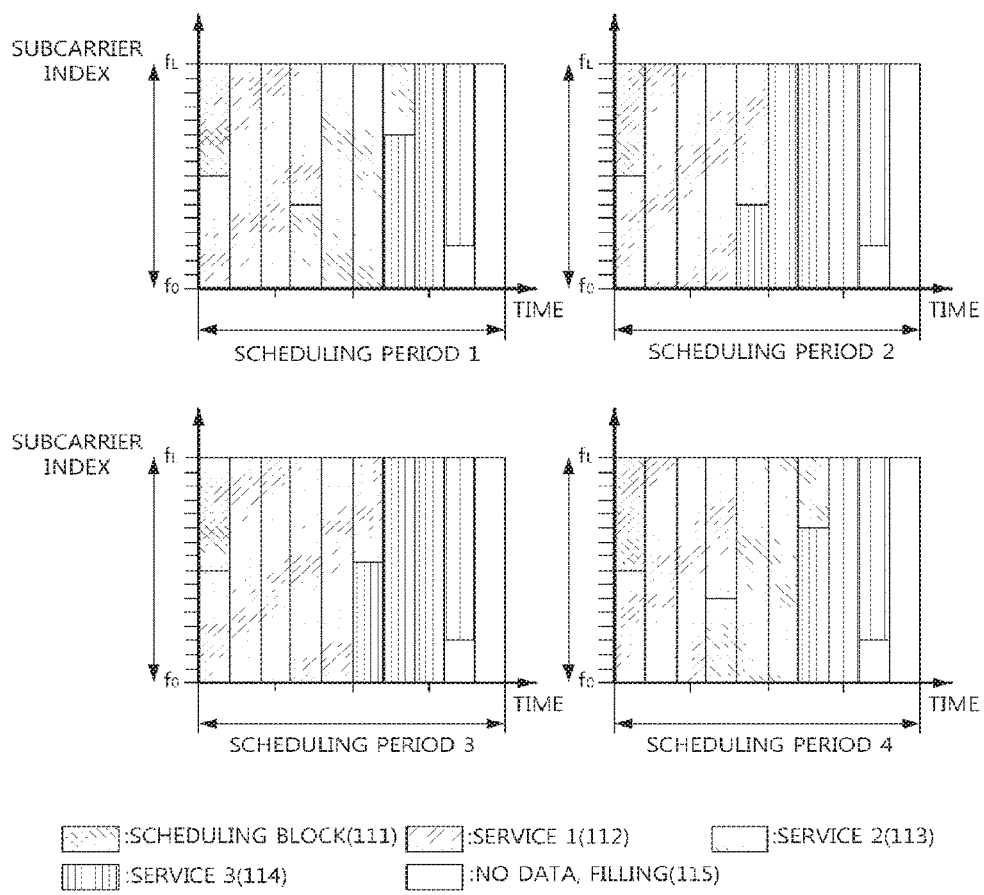
FIG. 3B illustrates a form of at least one continuous scheduling period to which the method of FIG. 3A is applied.

FIG. 3A illustrates an example of the scheduling block for the MBMS according to example embodiments of the present invention, and FIG. 3B illustrates a form of at least one continuous scheduling period to which the method of FIG. 3A is applied.

In the scheme suggested in FIG. 3A, a separate scheduling block 111 which includes scheduling information for all MBMSs belonging to a current scheduling period 101 is disposed at a first location in a time 103 and a frequency domain 102 within the scheduling period. Data traffic of the MBMS is allocated to a first MBMS 112, a second MBMS 113, and a third MBMS 114, and remaining portions are filled with no data, and filling 115 as padding. The scheduling block provides a start location and an end location of MBMSs which belong to the current scheduling period. For example, in the case of the first MBMS 112, time and subcarrier index information of the start location and time and subcarrier index information of the end location are reported in order to inform of a location of the data allocation portion 112. That is, the scheduling block is configured with the start location and the end location of each MBMS.

In the case of the scheme suggested in FIG. 3A, since the scheduling information is provided only for the current scheduling period, when a new MBMS user appears, if it is determined that an MBMS is present by reading the scheduling block of the current scheduling period, the user can be provided with an MBMS in the current scheduling period. Thus, there is an advantage of being capable of reducing a delay time until an MBMS is provided. However, as can been seen from FIG. 3B, even when an MBMS data service which is desired to be received is not present, the user terminal should be activated in order to check the scheduling block in every scheduling period. Particularly, in the case of FIG. 3B, when desiring to receive the second MBMS, the user terminal is activated in every scheduling period and thus performs an inefficient operation in the second and third scheduling periods.

Figure 4B:
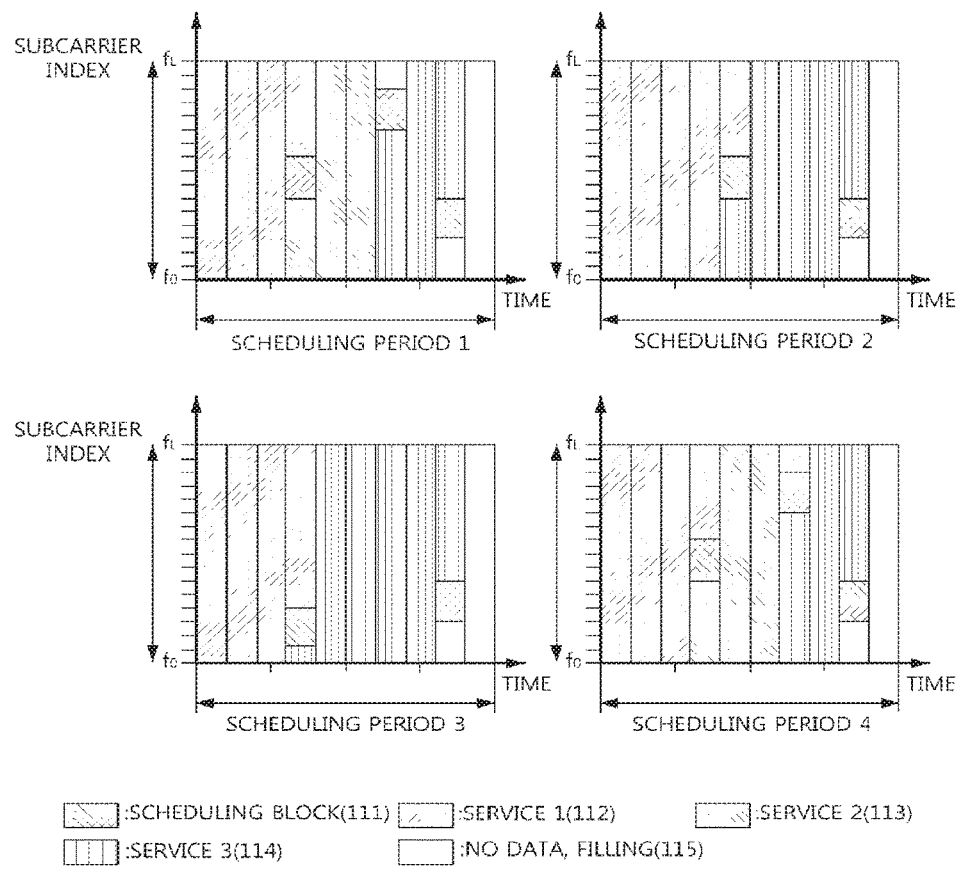
FIG. 4B illustrates a form of at least one continuous scheduling period to which the method of FIG. 4A is applied.

FIG. 4A illustrates another example of a scheduling block for an MBMS according to example embodiments of the present invention, and FIG. 4B illustrates a form of at least one continuous scheduling period to which the method of FIG. 4A is applied.

In a scheme suggested in FIG. 4A, after transmission of each MBMS data is completed, the scheduling information for the next scheduling period is transmitted. The scheduling information for an MBMS in the current scheduling period should be acquired in a previous scheduling period. Similarly to FIG. 3A, when an MBMS is present in the next scheduling period, the start location and the end location of the corresponding MBMS are reported as a time and a subcarrier index. Thus, in order to recognize a location of a specific MBMS in the next scheduling period, the scheduling block located at the last portion of the data transmission interval of the corresponding MBMS in the current scheduling period should be successfully received.

In the case of the scheme suggested in FIG. 4B, the scheduling information for the next scheduling period can be provided, and information representing that data for a specific MBMS is not present during the next or subsequent scheduling period can be transmitted with respect to an MBMS having no data. Thus, the user terminal which normally received the scheduling block for the corresponding MBMS can efficiently perform the discontinuous reception during one or more scheduling periods in which data is not present. For example, as illustrated in FIG. 4B, when the scheduling block for the second MBMS is successfully received in the first scheduling period, it is possible to recognize that the second MBMS is present again in the scheduling period 4, and thus the user terminal may not be activated in the scheduling periods 2 and 3. However, when the user terminal which desires to receive the second MBMS starting from the second scheduling period is present, a result worse than in the scheme of FIG. 3A may be obtained since it can be confirmed that data of the second MBMS is not present only when all data of the second and third scheduling periods are received.

Therefore, example embodiments of the present invention suggest a method of providing MBMS scheduling information for the current scheduling periods or scheduling information for a scheduling period subsequent thereto. According to example embodiments of the present invention, the location of the scheduling block may include the above-mentioned two cases or any other location, and information included in the scheduling block may be variable.

A first example embodiment of the present invention is as follows. When the scheduling block is located at the first portion of the scheduling period, the scheduling block includes the scheduling information of the MBMS, which is present in the corresponding scheduling period, with respect to the corresponding scheduling period and includes information for one or more subsequent scheduling periods with respect to the MBMS which is not present in the current scheduling period. At this time, the length of the scheduling block may be variable or fixed.

Figure 5:
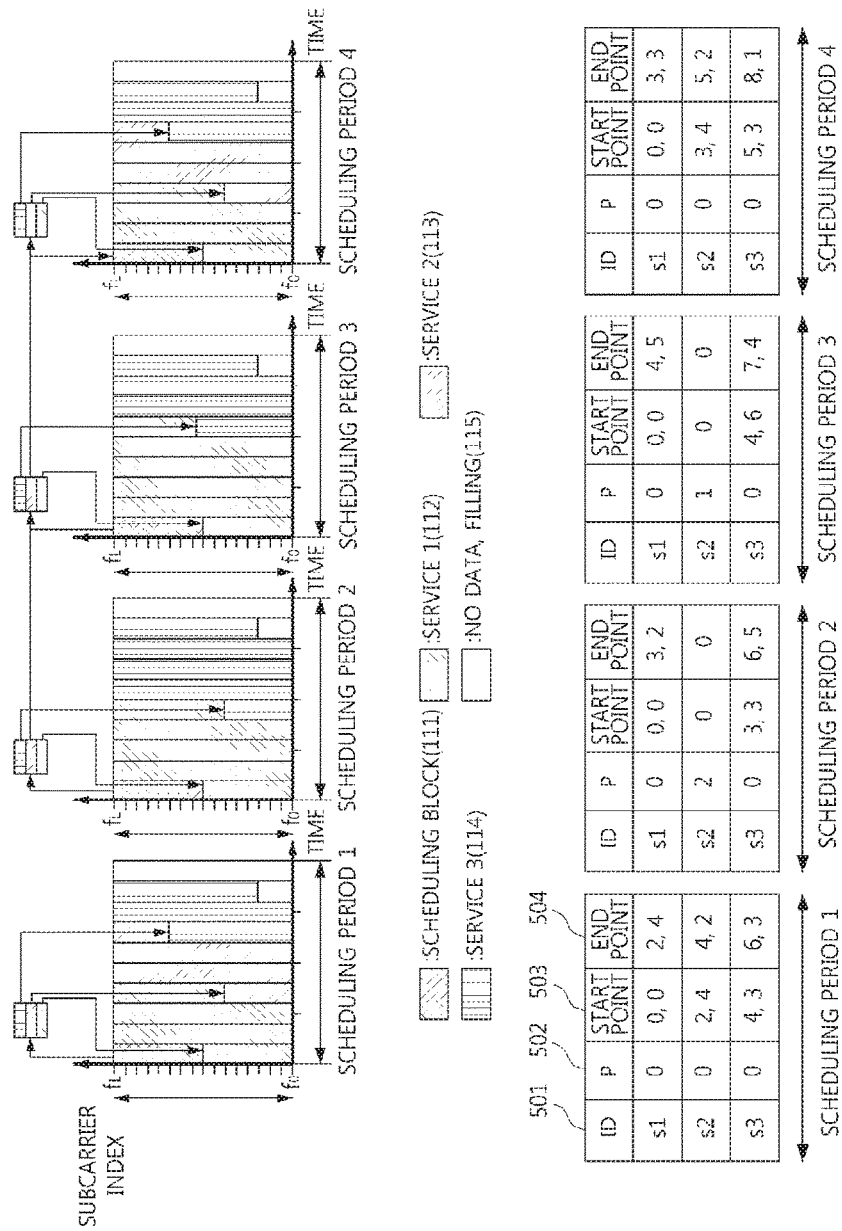
FIG. 5 illustrates a scheduling block and a configuration thereof according to each of MBMSs according to a first example embodiment of the present invention.

When the MBMS is scheduled in a manner similar to FIG. 4A and the length of the scheduling block is fixed, it may be represented in a form of an embodiment illustrated in FIG. 5.

FIG. 5 illustrates a scheduling block and a configuration thereof according to each of MBMSs according to a first example embodiment of the present invention.

In FIG. 5, ID 501 is an identifier of an MBMS which is currently being provided, and P (period) 502 represents the number of scheduling periods which should be waited for until a data service is provided. A start point 503 and an end point 504 represent a start location and an end location of a time and a frequency index of MBMS data of the current scheduling period, respectively. In the present embodiment, both the start point and the end point are used, but the scheduling block may be configured using only the start point. The P 502 having a value of "0" means that MBMS data is present in the current scheduling period, and the P 502 having a value of 1 or more means that the corresponding MBMS is present again after as many scheduling periods as the corresponding number have elapsed. According to this embodiment, values of the start point and the end point are not given to the MBMS having the service ID in which the P value is not 0.

FIG. 5 shows the scheduling block of the form including the P value, but the scheduling block of the form having no P value is also possible. For example, when both the start point and the end point are 0 as in the second scheduling period of FIG. 5, it can be easily inferred that the corresponding service is not included in the scheduling period in which the corresponding scheduling block is included. Thus, it is not necessary to report whether or not the corresponding service is included in the current scheduling period through the P value. That is, it can be indicated whether or not the specific service is present in the current scheduling period or the next scheduling period through the start point and the end point without using the P 502. According to example embodiments of the present invention, it can be indicated whether or not the specific service is present in the current scheduling period or the next scheduling period using either the start point or the end point, which will be described later in detail with reference to FIGS. 9A to 9C and FIGS. 10A to 10C.

Referring to FIG. 5, the second MBMS does not have the MBMS data from between the second scheduling period and the third scheduling period. Therefore, the scheduling block of the second scheduling period has 2 as the P value for the service ID s2. This is because MBMS transmission for the second service does not occur during the two scheduling periods including the current scheduling period. In this manner, even the user terminal which desires to newly receive the second MBMS starting from the second scheduling period can recognize that data of the second MBMS is not present in the third scheduling period, and thus, there is no need to receive all data of each scheduling period (the user terminal does not need to be activated in the third scheduling period). As a result, more efficient power management of the user terminal is possible. When the third scheduling period comes, the P value of s2 is reduced to 1, and it is reported that data of the second MBMS is present after one scheduling period.

As a second example embodiment of the present invention, the scheduling block may be disposed at a location where transmission of each MBMS data service is finished. In this case, the length of the scheduling block is fixed. This case is illustrated in FIG. 6.

Figure 6:
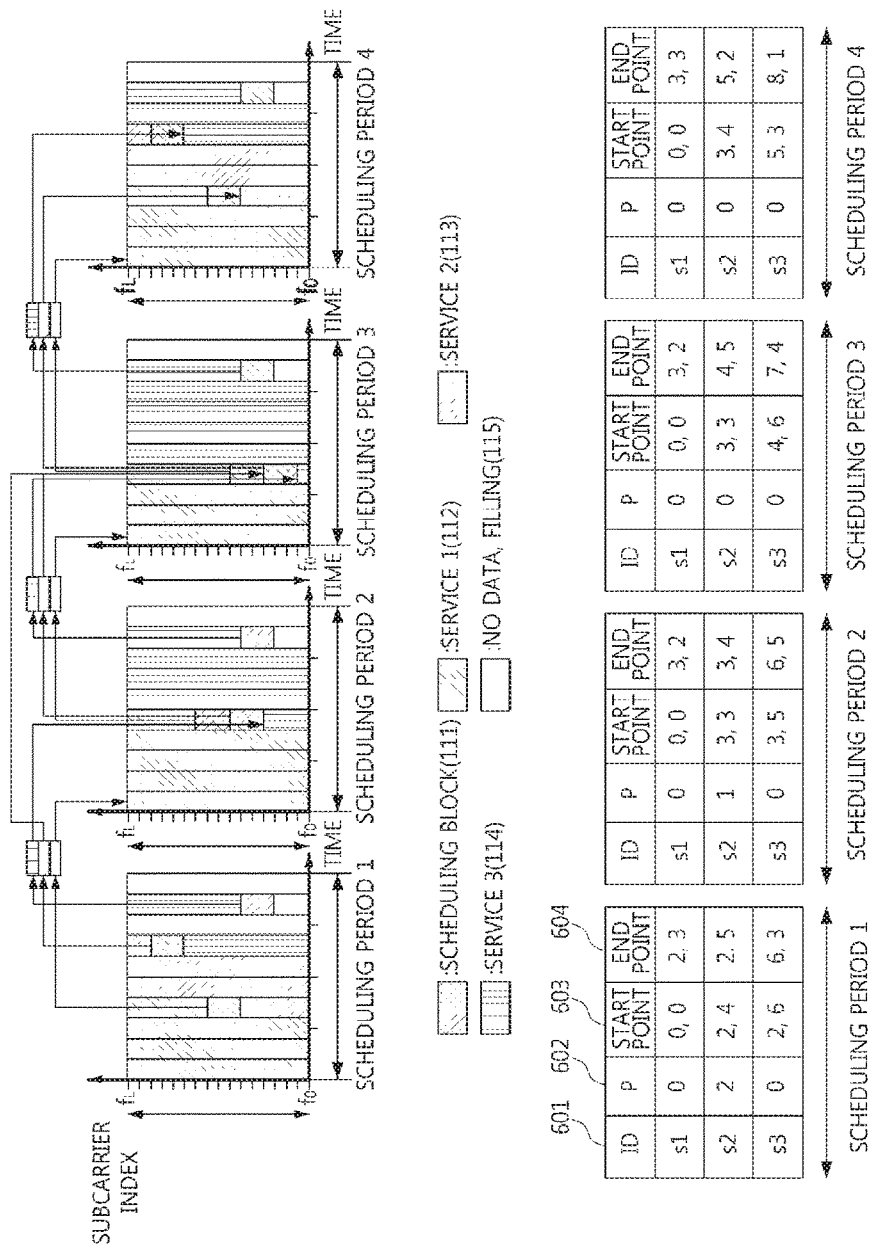
FIG. 6 illustrates a scheduling block and a configuration thereof according to each of MBMSs according to a second example embodiment of the present invention.

FIG. 6 illustrates a scheduling block and a configuration thereof according to each of MBMSs according to a second example embodiment of the present invention.

Referring to FIG. 6, the scheduling block of each MBMS provided in the current scheduling period includes scheduling information for the next or subsequent scheduling period. When a P 602 value is 0, a start point 603 and an end point 604 of a corresponding ID 601 represent a start location and an end location of MBMS data in the next scheduling period, respectively. In FIG. 6, therefore, when the P value is 2 in the first scheduling period like the second MBMS having s2 as the service ID, MBMS data is not present in the second and third scheduling periods. Since the user terminal which successfully received the scheduling block of the second MBMS in the first scheduling period is not activated in the second scheduling period, power can be efficiently managed. However, the user terminal should be activated again in the third scheduling period and acquire start location information and end location information of MBMS data in the next scheduling period.

Even in the case of the MBMS in which MBMS data is not present in the current scheduling period, the scheduling block of the corresponding MBMS is provided. For example, when the user terminal which desires to newly receive the second MBMS enters the second scheduling period, the user terminal can recognize that data of the second MBMS will be transmitted again in the fourth scheduling period through the P value. Further, it is possible to recognize the start location and the end location of the scheduling block in which the ID is s2 in the third scheduling period according to the scheduling information suggested in the scheduling block in which the ID is s2 in the second scheduling period. By reading the s2 scheduling block in the third scheduling period, MBMS data in which the ID is s2 in the fourth scheduling period can be received. Thus, it is possible to receive the MBMS more efficiently than in the method capable of receiving MBMS data only when receiving all scheduling periods in the conventional art.

According to example embodiments of the present invention, information which configures the scheduling block may be variable, which is illustrated in FIG. 7.

FIG. 7 illustrates a scheduling block and a configuration thereof according to each of MBMSs according to a third example embodiment of the present invention.

FIG. 7 illustrates an embodiment in which the length of the scheduling block is variably set. A service ID 701 is an identifier of the MBMS, and P 702 represents the number of scheduling periods which remain until a scheduling period in which corresponding MBMS data is present. A start point 703 and an end point 704 represent a start location and an end location of MBMS data, respectively. Further, an end tag 705 means that there is no further information for a specific service ID and that information for the next MBMS will be provided.

FIG. 8 illustrates a configuration of a scheduling block of each of MBMSs according to a fourth example embodiment of the present invention.

In FIG. 8, the MBMS data is scheduled in a manner similar to FIG. 4B, and the scheduling block is located at a front portion of the scheduling period. The scheduling block is configured with a service ID 801, P 802, and a start point value. The MBMS data interval can be obtained only through the start point value of each MBMS data. In this case, a location immediately before the start location of the next MBMS data will be an end location of the current MBMS data.

For example, let us look at a location of the resource allocated to an MBMS data service in which the service ID is s1 in the first scheduling period. In the first scheduling period of FIG. 8, the service ID s1 has only information (0,0) related to the start point. However, considering that the start point of the service ID s2 is (2,4), it can be understood that the service ID s1 is the MBMS data service which is present from a location of the time index 0 and the subcarrier index 0 to a location immediately before the start location of s2, that is, a location of the time index 2 and the subcarrier index 3.

Further, let us look at a location of the resource allocated to the MBMS data service in which the service TD is s1 in the second scheduling period. In the second scheduling period of FIG. 8, the service ID s1 has information (0, 0) related to the start point, and s2 does not have MBMS data in the current scheduling period. Further, s3 has information (3, 3) related to the start point. Thus, in the second scheduling period, it can be understood that the service ID s1 is the MBMS data service which is present from a location of the time index 0 and the subcarrier index 0 to a location immediately before the start location of s2, that is, a location of the time index 3 and the subcarrier index 2.

As described above, using the scheduling information providing method according to example embodiments of the present invention, there is an advantage that power management of the user terminal is easy, and a time delay when initially entering the MBMS and a service moving time when selecting a different MBMS (for example, changing a channel) are reduced.

Figure 9A:
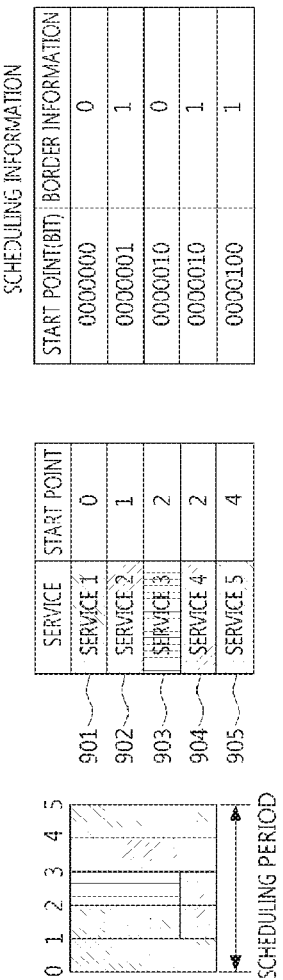
FIGS. 9A to 9C illustrate a configuration of a scheduling block according to each of MBMSs according to a fifth example embodiment of the present invention.
Figure 9B:
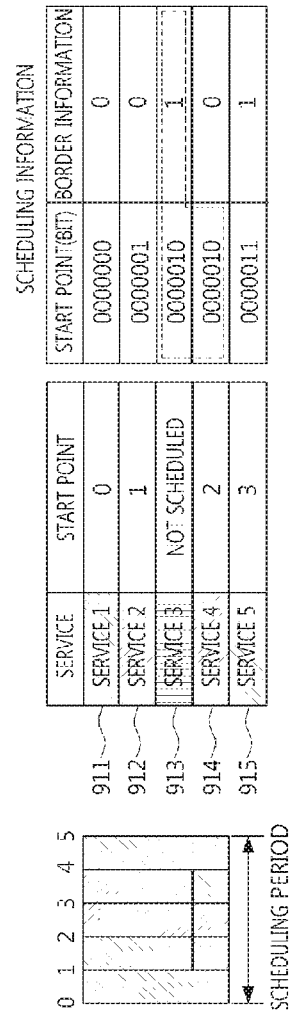
Figure 9C:
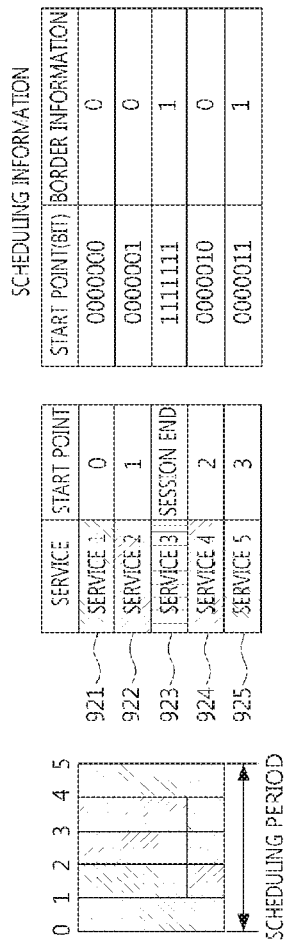

FIGS. 9A to 9C illustrate a configuration of a scheduling block according to each of MBMSs according to a fifth example embodiment of the present invention.

In a method of configuring scheduling information according to a fifth example embodiment of the present invention which is illustrated in FIGS. 9A to 9C, scheduling information is configured with either a start location or an end location of a service and border indicator information which is added. That is, one of the starting location and the end location is combined with the border information to provide information through which it is determined whether or not a corresponding MBMS is supported during a current scheduling period. Further, the same combination is used to provide information through which the user terminal is notified of a session stop so that the user terminal stops unnecessary reception.

In detail, in FIG. 9A, when the MTCH corresponding to each service is allocated to a subframe in a situation in which various MBMSs are present, it can be reported through the border information whether or not the last resource of the subframe was used. A first service 901 and a third service 903 did not use the last resource of the subframe, and thus the border information is indicated by "0." Since the other services used the last resource of the subframe, the border information is indicated by "1." Of course, this is an example embodiment, and the border information which used the last resource may be indicated by "0," and information which did not use the last resource may be indicated by "1." That is, as long as the case of using the last resource and the case of not using the last resource can be discriminatorily represented, the present embodiment can be modified to any form. Further, in the present embodiment, the starting point has 7 bits, but it may be expressed by bits of various lengths, for example, 12 bits or 16 bits.

FIG. 9B illustrates an embodiment in which when a service which is not supported is present during a scheduling period, it is indicated by using either of the starting point and the end point with the border information. FIG. 9B illustrates a case where a third service 913 is not supported, and as illustrated in FIG. 9B, it can be represented by a combination of the start point and the border information. When configuring the scheduling information, the third service 913 and the fourth service 914 are set to use the same start point, and the border information of the third service is indicated by "1." In this case, it is a contradiction that the border information of the third service is "1" even though the start point of the fourth service transmitted after the third service is the same as the start point of the third service, and thus through this fact, it is possible to obtain information representing that the third service is not supported during the corresponding scheduling period. That is, when the services having the same start point are found, if the service in which the border information is indicated by 1 is present, this service is the service which is not supported in the current scheduling period (the border information "1" means that the last resource of the corresponding subframe was used).

Meanwhile, it can be indicated using only the start point information without using the border information whether or not the specific service is supported. For example, even through there is no border information in FIG. 9B, it can be determined that the third service is substantially not provided in the corresponding scheduling period since the start point information of the fourth service is the same as the start point information of the third service. This embodiment corresponds to an embodiment in which either of the start point and the end point is used to indicate whether the specific service is present in the corresponding scheduling period or the next scheduling period.

FIG. 9C illustrates an embodiment in which when a service in which a session was finished is present during a scheduling period, it is indicated by using either of the starting point and the end point with the border information. When a session of the third service 923 has finished, it is reported through the scheduling information, and all bits of the scheduling information corresponding to the third service are configured only with "1." For example, in the case of 8 bits, it is indicated by "11111111." As in FIG. 9C, even when a service in which a session has finished is present, information related to whether or not a session has finished can be represented using only the start point. For example, if all bits of the start point are configured only with "1," that is, "11111111" like the case of the third service of FIG. 9C, it is possible to indicate that the session related to the corresponding service finished without using the separate border information.

Figure 10A:
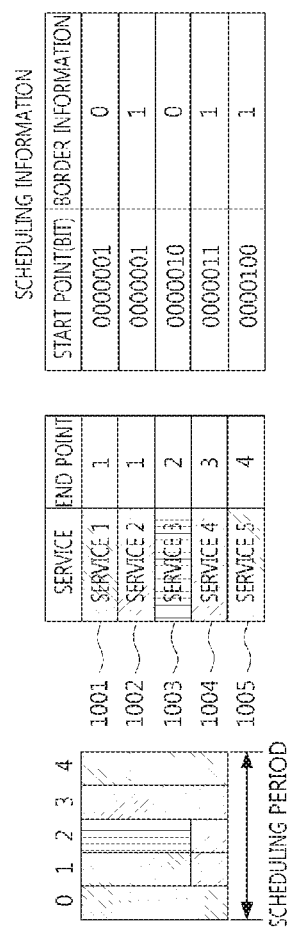
FIGS. 10A to 10C are views illustrating a configuration of the scheduling block according to each of MBMSs according to a sixth example embodiment of the present invention.
Figure 10B:
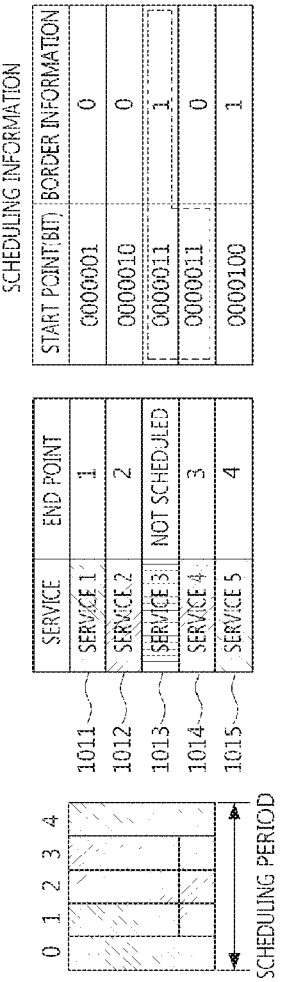
Figure 10C:
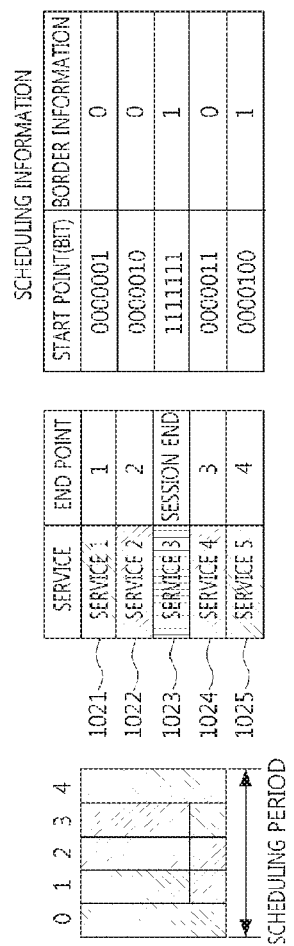

FIGS. 10A to 10C are views illustrating a configuration of the scheduling block according to each of MBMSs according to a sixth example embodiment of the present invention.

FIG. 10A illustrates an embodiment of a scheme of enabling an efficient terminal operation using the border information, and the border information "1" means a case where the last resource of the subframe was used. Since the border information of the second service 1002 is indicated by "1," this means that the remaining resources of the subframe 1 are allocated to the second service. Thus, a case where the user terminal which desires to receive the third service 1003 should unnecessarily receive the subframe 1 can be eliminated. Here, an embodiment in which the border information "0" is set to represent that the last resource of the corresponding subframe was used is also possible.

FIG. 10B also illustrates an example of a method of indicating a service which is not supported in the current scheduling period by using the end point and the border information similarly to FIG. 9B. The third service 1013 and the fourth service 1014 have the same end point, but the border information of the third service is indicated by "1." This cannot occur under normal circumstances, and means that the third service is not supported during the current scheduling period.

Similarly to the case of FIG. 9B, it can be indicated using only the end point information without using the border information whether or not the specific service is supported. For example, in FIG. 10B, even though the border information is not present, since the start point of the fourth service is the same as the start point of the third service, it can be determined that the third service is substantially not provided in the corresponding scheduling period. This embodiment corresponds to an embodiment in which either of the start point and the end point is used to indicate whether the specific service is present in the corresponding scheduling period or the next scheduling period as described above in FIG. 5.

In FIG. 10C, similarly to FIG. 9C, the scheduling information is used to indicate that the session has finished, and the scheduling information of the corresponding service in which the session finished is configured only with "1" as described above. Similarly to FIG. 9C, only the end point without the border information can be used to represent information related to whether or not the session has finished. For example, if all bits of the end point are configured only with "1," that is, "11111111" like the case of the third service of FIG. 10C, it is possible to indicate that the session related to the corresponding service was finished without using the separate border information.

In both cases of using the start point or the end point, when the service is accurately finished without padding to the last subframe, that is, when the border information of the last service is "1" and the end point is the last subframe regardless of the start point, it is determined whether or not there is padding by including information which cannot be located in the scheduling period as the start location of padding. That is, when there is no padding, a value or a special different value which cannot be included in the scheduling period may be used as the start point or the end point of padding.

In the above-mentioned example embodiments, various embodiments of the present invention have been suggested for the MBMS, but the present invention can be applied to the case of scheduling necessary for providing the multicast broadcast service including the multicast and broadcast service (MBS) as well as the MBMS regardless of the name.

While the example embodiments of the present invention and their advantages have been described in detail, it should be understood that various changes, substitutions and alterations may be made herein without departing from the scope of the invention.

The invention claimed is:

1. A method for providing multimedia services, comprising:
   determining that a first multimedia service is provided during a first period;
   determining that a second multimedia service is not provided during the first period;
   generating a first message comprising a first identifier, a first value, a second identifier and a second value, wherein the first multimedia service is associated with the first identifier and the first value, and the second multimedia service is associated with the second identifier and the second value; and
   transmitting a plurality of subframes including a first subframe during the first period, wherein:
   the first subframe comprises the first message,
   the first subframe is transmitted before other subframes of the plurality of subframes are transmitted, and
   the second value is equal to a predetermined value indicating that the second service is not provided during the first period.

2. The method of claim 1, wherein the predetermined value indicates that an associated multimedia service is not provided during a corresponding period.

3. The method of claim 1, wherein the first value indicates in which subframe the first multimedia service ends in the first period.

4. The method of claim 1, wherein the first message comprises a first block of data and a second block of data consecutively, the first block of data comprises the first identifier and the first value, and the second block of data comprises the second identifier and the second value.

5. The method of claim 1, wherein no multimedia service is provided during a last subframe of the first period.

6. A communication apparatus, comprising:
   a memory; and
   a processor operably coupled to the memory,
   wherein the processor, when executing program instructions stored in the memory, is configured to:
   determine that a first multimedia service is provided during a first period;
   determine that a second multimedia service is not provided during the first period;
   cause the communication apparatus to generate a first message comprising a first identifier, a first value, a second identifier and a second value, wherein the first multimedia service is associated with the first identifier and the first value, and the second multimedia service is associated with the second identifier and the second value; and cause the communication apparatus to transmit a plurality of subframes including a first subframe during the first period, wherein:

the first subframe comprises the first message, the first subframe is transmitted before other subframes of the plurality of subframes are transmitted, and the second value is equal to a predetermined value indicating that the second service is not provided during the first period.

7. The communication apparatus of claim 6, wherein the predetermined value indicates that an associated multimedia service is not provided during a corresponding period.

8. The communication apparatus of claim 6, wherein the first value indicates in which subframe the first multimedia service ends in the first period.

9. The communication apparatus of claim 6, wherein the first message comprises a first block of data and a second block of data consecutively, the first block of data comprises the first identifier and the first value, and the second block of data comprises the second identifier and the second value.

10. The communication apparatus of claim 6, wherein no multimedia service is provided during a last subframe of the first period.

11. A method for receiving multimedia services, comprising:

receiving a plurality of subframes including a first subframe during a first period;

obtaining a first message from the first subframe, wherein the first message comprises a first identifier, a first value, a second identifier and a second value;

obtaining a first multimedia service during the first period based on the first identifier and the first value; and determining that a second multimedia service is not provided during the first period based on the second identifier and the second value, wherein:

the first subframe comprises the first message, the first subframe is received before other subframes of the plurality of subframes are received, and the second value is equal to a predetermined value indicating that the second service is not provided during the first period.

12. The method of claim 11, the predetermined value indicates that an associated multimedia service is not provided during a corresponding period.

13. The method of claim 11, wherein the first value indicates in which subframe the first multimedia service ends in the first period.

14. The method of claim 11, wherein the first message comprises a first block of data and a second block of data consecutively, the first block of data comprises the first identifier and the first value, and the second block of data comprises the second identifier and the second value.

15. The method of claim 11, wherein no multimedia service is provided during a last subframe of the first period.

16. A user equipment (UE), comprising:

a memory; and a processor operably coupled to the memory, wherein the processor, when executing program instructions stored in the memory, is configured to:

cause the UE to receive a plurality of subframes including a first subframe during a first period;

cause the UE to obtain a first message from the first subframe, wherein the first message comprises a first identifier, a first value, a second identifier and a second value;

cause the UE to obtain a first multimedia service during the first period based on the first identifier and the first value; and determine that a second multimedia service is not provided during the first period based on the second identifier and the second value, wherein:

the first subframe comprises the first message, the first subframe is received before other subframes of the plurality of subframes are received, and the second value is equal to a predetermined value indicating that the second service is not provided during the first period.

17. The UE of claim 16, wherein the predetermined value indicates that an associated multimedia service is not provided during a corresponding period.

18. The UE of claim 16, wherein the first value indicates in which subframe the first multimedia service ends in the first period.

19. The UE of claim 16, wherein the first message comprises a first block of data and a second block of data consecutively, the first block of data comprises the first identifier and the first value, and the second block of data comprises the second identifier and the second value.

20. The UE of claim 16, wherein no multimedia service is provided during a last subframe of the first period.

21. A communication device for a user equipment (UE), comprising:

a memory; and a processor operably coupled to the memory, wherein the processor, when executing program instructions stored in the memory, is configured to:

cause the UE to receive a plurality of subframes including a first subframe during a first period;

cause the UE to obtain a first message from the first subframe, wherein the first message comprises a first identifier, a first value, a second identifier and a second value;

cause the UE to obtain a first multimedia service during the first period based on the first identifier and the first value; and determine that a second multimedia service is not provided during the first period based on the second identifier and the second value, wherein:

the first subframe comprises the first message, the first subframe is received before other subframes of the plurality of subframes are received, and the second value is equal to a predetermined value indicating that the second service is not provided during the first period.

22. The communication device of claim 21, wherein the predetermined value indicates that an associated multimedia service is not provided during a corresponding period.

23. The communication device of claim 21, wherein the first value indicates in which subframe the first multimedia service ends in the first period.

24. The communication device of claim 21, wherein the first message comprises a first block of data and a second block of data consecutively, the first block of data comprises the first identifier and the first value, and the second block of data comprises the second identifier and the second value.

25. The communication device of claim 21, wherein no multimedia service is provided during a last subframe of the first period.

\* \* \* \* \*